Sept. 21, 1937. A. BERKNER Re. 20,509

SLIDE FASTENING MEANS

Original Filed June 24, 1933

ARTHUR BERKNER.
INVENTOR.

WITNESS:

BY Ely & Pattison.

ATTORNEYS.

Reissued Sept. 21, 1937

Re. 20,509

UNITED STATES PATENT OFFICE 20,509

SLIDE FASTENING MEANS

Arthur Berkner, Passaic, N. J., assignor to Glida Corp. of America, New York, N. Y., a corporation of New York Original No. 2,002,360, dated May 21, 1935, Serial No. 677,363, June 24, 1933. Application for reissue April 13, 1936, Serial No. 74,229

4 Claims. (Cl. 24—207)

This invention relates to new and useful improvements in closing and fastening means for garments, underwear, shoes, bags and the like; and it has for its principal object to provide a device that will prove superior to those now in use on the market.

Another important feature of the invention resides in a slide fastener device which includes a novel locking pull member for releasably securing the fastener device in open, closed, or any intermediate position.

The said device is of such a construction that it may be adaptable for a good many purposes and consequently will have a wide scope of application.

Another advantage of the device is to the effect that the latter is simple to operate, sturdy and infallible in use, and may easily be repaired, if, after a long wear, some parts should be worn out.

As the device, although unique of conception, is very plain of construction, the cost of manufacturing should be proportionately low thereby assuring a great market for the same.

With the above and other objects in view, this invention consists of the novel features of construction, combination and arrangement of parts, hereinafter fully described, claimed and illustrated in the accompanying drawing forming part of this specification, and in which similar characters of reference indicate corresponding parts in all views, and in which:

Figure 4:
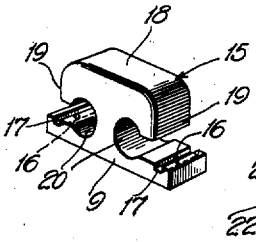
Figure 4 is a perspective view of one of the slide fastener elements per se.
Figure 6:
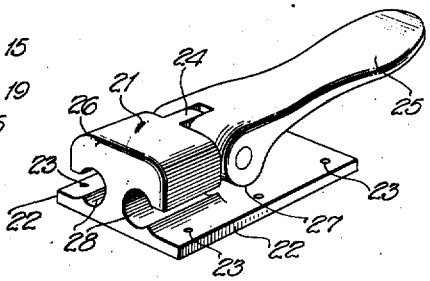
Figure 6 is a perspective view of the locking member per se.

Referring more particularly to the drawing, 10 indicates a portion of an article to which my device is applicable; the present purpose of the said device being, as will appear evident, to open or close the separable flexible flaps 11 and 12 constituting opposite sides of an opening provided in the article 10. The flaps 11 and 12 are provided with beads 13—13 on their respective inner edges. Inwardly of the plane of the flaps is arranged a flexible strip 14 of a length approximating the length of the beaded edges 13. The strip 14 is preferably in the form of a length of fabric tape, but may be of any other suitable flexible material if desired. The strip 14 has attached thereto, a plurality of slide fastener elements 15, one of which is shown per se in Figure 4. Each of the slide fastener elements includes a relatively flat base 9 having thread openings 16 therein for securing them, for instance by sewing to the strip 14, and in addition, the outer face of the base is provided with grooves 17 into which the openings 16 open to receive the sew threads, or the cement or glue in case it should be desired to secure the fastener elements 15 to the strip 14 in the said latter manner. The fastener elements 15 are secured to the strip 14 at intervals and each further includes a head 18 of less width than the base 9 and which head extends outwardly from the base 9. The outer opposite side edges of the head are rounded as at 19—19, while opposite sides of the head are provided bead receiving grooves or channels 20—20 which are circular in cross section and open outwardly to respectively and slidably receive the beads 13—13.

The flexible element 14 is fixedly secured by stitching 29 to the flaps 11 and 12 at one end of the opening which the device is adapted to open or close, while the opposite end of the flexible element is free and has attached thereto a manipulable releasable lock fastener member 21. The fastener member 21 has a flat base 22 for securing it to the flexible element 14, for instance by sewing; the apertures 23 in the base being shown for that purpose. The fastener member 21 also includes a reduced integral head 26 of a width less than the width of the base and which is flush with the inner end of the base but which terminates short of the outer end thereof. The head 26 has circular shaped bead grooves or channels 28 in opposite sides thereof and with the base 22 correspond in general shape and perform the same functions as the like parts forming part of each slide fastener member 15. Extending from the outer end of the head 26 is an ear 24 to which the inner bifurcated end of a combined manipulating pull and lock tongue 25 is pivotally connected. The furcations at the bifurcated end of the tongue are provided with cam portions 27 disposed in alinement with the bead receiving channels 28 in opposite sides of the head 26. The tongue 25 serves as a manipulating pull element for slidably actuating the device to open and closed positions, and also constitutes a means by which the fastener member 21 may be releasably held against sliding movement in any of its positions along the length of the beads 13—13.

Figure 1:
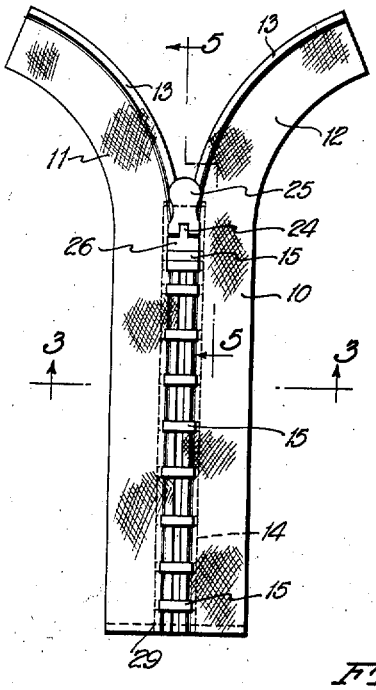
Figure 1 is a plan view of my invention showing the fastening device in partially open position.
Figure 2:
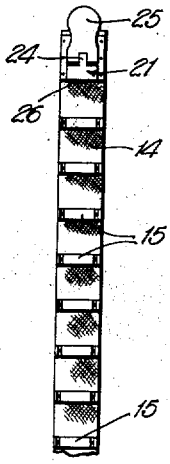
Figure 2 is a plan view of the sliding or manipulating member of my device per se, showing the upper surface thereof.
Figure 3:
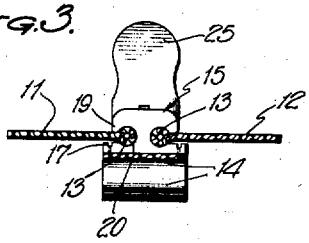
Figure 3 is a transverse sectional view on the line 3—3 of Figure 1, with the clamping member in released position.
Figure 5:
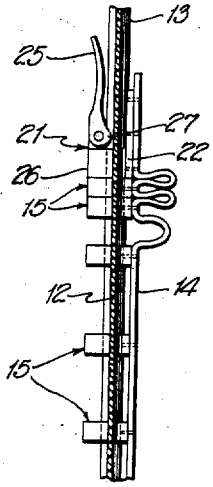
Figure 5 is a longitudinal sectional view taken on the line 5—5 of Figure 1.

The releasing and fastening operation above referred to is performed by the cam portions 27 on the tongue 25, for when pushed inwardly to the position shown in Figure 5 the same tightly grip the beads 13—13 of the flaps 11 and 12 against the base 22. By clamping the slide fastener member 21 to the beads 13—13, the fastening device is locked against operation, but upon pulling outwardly upon the tongue 25 to the position shown in Figure 3, the member 21 is released and free to slide with the fastener elements 15.

It will be understood that when the fastening device is in fully closed position the slide fastener elements will be disposed at spaced distances along the length of the beads. During the initial opening operation, the flat inner end of the manipulable fastener member 21 flatly contacts the adjacent flat end of the next fastener member 15 to impart a straight push to avoid binding or jamming which would result if the engaging members did not contact simultaneously on both the inner and outer sides of the beads 13. The other adjacent fastener members similarly engage each other as the manipulable pull fastener member moves to the limit of its opening movement, at which time all the adjacent ends of the fastener members will be in flat contacting engagement.

When the slide fastener device is in fully closed position, the flexible strip 14 underlies the joint between the adjacent beaded edges 13—13 and serves to close the full length of the same.

It is obvious that changes may be made in the form, construction and arrangement of parts, as shown, within the scope of the appended claims, without departing from the spirit of the invention, and I do not therefore wish to limit myself to the construction and arrangement shown and described therein.

Having thus described the invention, what I claim as new and desire to secure by Letters Patent of the United States, is:—

1. A device of the class described, comprising in combination, a pair of flexible members to be fastened together, beads upon adjacent edges of the flexible members, a strip of flexible material arranged inwardly of the flexible members and having one of its ends fixedly connected thereto, fastener members secured to the said strip at intervals therealong, each of the said fastener members comprising a base, and a head extending outwardly from said base having grooves in opposite sides thereof receiving the resepective beads, the base having stitch receiving openings and grooves receiving sew-on threads for securing the fasteners to said strip of flexible material, a manipulating slide fastener member mounted at the free end of said strip of pliable material, said manipulating fastener member including a base and a head, a manipulating tongue pivotally secured to said last head, and clamping means on said manipulating tongue comprising cam surfaces for gripping the flexible members against said base to arrest the movement of the strip relative to the flexible members.

2. A device of the class described, comprising, a pair of flexible members to be fastened together, beads upon adjacent edges of the flexible members, a strip of flexible material arranged inwardly of said flexible members and having one of its ends fixedly connected thereto, fastener elements secured to the said strip at intervals, each of said fastener elements comprising a flat base having grooves and apertures therein receiving sew-on threads for securing the same to said strip, a head integral with said base and extending outwardly therefrom and having bead receiving grooves in opposite sides thereof, a manipulating member connected to the free end of said strip of pliable material, and comprising a slide fastening member formed with a central ear and having a thumb piece pivotally secured to said ear, and cam means on the inner end of said thumb piece for engaging the flexible members, substantially as shown and described.

3. A device of the class described, comprising in combination, a pair of flexible members to be fastened together, beads upon adjacent edges of the flexible members, a strip of flexible material arranged inwardly of the flexible members and having one of its ends fixedly connected thereto, fastener members secured to the said strip at intervals therealong, each of the said fastener members comprising a base, and a head extending outwardly from said base having grooves in opposite sides thereof receiving the respective beads, a manipulating slide fastener member mounted at the free end of said strip of pliable material, said manipulating fastener member including a base and a head, a manipulating tongue pivotally secured to said last head, and clamping means on said manipulating tongue comprising cam surfaces for gripping the flexible members against said base to arrest the movement of the strip relative to the flexible members.

4. A device of the class described, comprising, a pair of flexible members to be fastened together, beads upon adjacent edges of the flexible members, a strip of flexible material arranged inwardly of said flexible members and having one of its ends fixedly connected thereto, fastener elements secured to the said strip at intervals, each of said fastener elements comprising a flat base, a head integral with said base and extending outwardly therefrom and having bead receiving grooves in opposite sides thereof, a manipulating member connected to the free end of said strip of flexible material, and comprising a slide fastening member formed with a central ear and having a thumb piece pivotally secured to said ear, and cam means on the inner end of said thumb piece for engaging the flexible members, substantially as shown and described.

ARTHUR BERKNER.